United States Patent [19]

Seitz et al.

[11] Patent Number: 4,697,007

[45] Date of Patent: Sep. 29, 1987

[54] PREPARATION OF MICROCRYSTALLINE TRIACETYLCELLULOSE

[75] Inventors: Georg Seitz, Darmstadt; Rainer Wernicke, Neu-Isenburg, both of Fed. Rep. of Germany

[73] Assignee: Merck Patent Gesellschaft mit beschrankter Haftung, Darmstadt, Fed. Rep. of Germany

[21] Appl. No.: 707,130

[22] Filed: Mar. 1, 1985

[30] Foreign Application Priority Data

Mar. 1, 1984 [DE] Fed. Rep. of Germany ....... 3407596

[51] Int. Cl.$^4$ ................................................ C08B 3/06
[52] U.S. Cl. ...................................... 536/83; 210/635; 210/502.1; 502/439; 536/69; 536/73; 536/74; 536/76
[58] Field of Search ................ 210/635, 500.31, 502.1; 502/168, 401, 404, 439; 536/69, 73, 74, 76, 83

[56] References Cited

U.S. PATENT DOCUMENTS 2,430,911 11/1947 Charch et al. .................... 502/168
3,179,587 4/1965 Battista et al. ...................... 210/635
3,598,245 8/1971 Determann ........................ 210/635
3,632,843 1/1972 Allen et al. ......................... 502/168
3,843,702 10/1974 Montigny et al. .................. 502/168
4,521,308 6/1985 Brimhall, Jr. ...................... 210/406
4,547,474 10/1985 Olah .................................. 502/168

OTHER PUBLICATIONS

The Condensed Chemical Dictionary–Eight edition by Hawley, Van Nostrand Reinhold Co. of New York, pp. 85 and 397, 1971.

Primary Examiner—Ernest G. Therkorn
Attorney, Agent, or Firm—Millen & White

[57] ABSTRACT

The preparation of microcrystalline triacetylcellulose by acid-catalyzed acetylation of microcrystalline cellulose, perfluoroalkanesulfonic acids with 1 to 8 carbon atoms are used as the catalyst, resulting in a non-hazardous process and high yields of exceptionally high purity product, the latter being particularly suitable for chromatographic purposes, in particular for the chromatographic resolution of racemates.

6 Claims, No Drawings

PREPARATION OF MICROCRYSTALLINE TRIACETYLCELLULOSE

BACKGROUND OF THE INVENTION

This invention relates to a new process for the preparation of microcrystalline triacetylcellulose.

There is an increasing demand for microcrystalline triacetylcellulose, which is chiefly used as a chromatographic adsorbent. This material is particularly suitable for the chromatographic resolution of racemates, the substantial or complete separation of the racemic forms into the corresponding enantiomers by chromatography on microcrystalline triacetylcellulose being possible for a large number of chiral compounds in particular.

It is possible to prepare microcrystalline triacetylcellulose by a process described by G. Hesse and R. Hagel (Chromatographia 6, 277 (1973), Chromatographia 9, 62 (1976) and Liebigs Annalen der Chemie 996 (1976)). In this process, microcrystalline cellulose is acetylated under gentle conditions with acetic acid and acetic anhydride in the presence of an amount of perchloric acid as a catalyst. Although this process is suitable for the preparation of microcrystalline triacetylcellulose on a laboratory scale, it presents serious hazards on an industrial scale.

Perchloric acid yields extremely explosive mixtures with organic substances and is therefore subject to strict safety measures and restrictions in handling. Industrial preparation of microcrystalline triacetylcellulose by this process using perchloric acid is therefore either impossible, or possible only if rigorous and expensive safety measures are taken.

SUMMARY OF THE INVENTION

An object of this invention, therefore, is to provide a suitable replacement for the explosive-prone perchloric acid used as the catalyst in the prior art process.

Accordingly, another object is to provide a new industrial scale process for the preparation of microcrystalline triacetylcellulose and the product obtained thereby.

Another object is to employ the improved product as a chromatographic adsorbent.

Upon further study of the specification and appended claims, further objects and advantages of this invention will become apparent to those skilled in the art.

Attempts to replace the perchloric acid in the known process by other acids, such as sulfuric acid, p-toluenesulfonic acid, trifluoroacetic acid or methane-sulfonic acid have either failed or led to a result which was completely unsatisfactory with respect to the yield and quality of the product.

Surprisingly, it has now been found that microcrystalline triacetylcellulose can be obtained in a high yield and outstanding quality if the acetylation of microcrystalline cellulose is conducted in the presence of a catalytic quantity of at least one perfluoroalkanesulfonic acid having 1-8 carbon atoms. The alkanesulfonic acids having 1 to 8 C atoms can be either straight chain or branched, the H atoms of the alkyl part being completely replaced by fluorine. Perfluoroalkanesulfonic acids having 1-3 C atoms are preferred. Of these, trifluoromethanesulfonic acid is particularly preferred.

The process of the present invention for the preparation of microcrystalline triacetylcellulose is carried out analogously to the known process. The only difference is that one or more of the perfluoroalkanesulfonic acids according to the invention is used as the catalyst in the acetylation of cellulose instead of the perchloric acid which was used heretofore. The use of one of these acids is preferred, but mixtures of several of these acids can also be employed. They can be used in an amount equivalent to that of the perchloric acid. Since, in contrast to perchloric acid, perfluoroalkanesulfonic acids exhibit no oxidizing properties, the amount thereof used in the reaction is less important as long as a catalytic amount is employed. It has proved advantageous, however, to add 1 to 10 percent by weight, preferably 2 to 5 percent by weight, based on the amount of cellulose.

To prepare microcrystalline triacetylcellulose by the process according to the invention, microcrystalline cellulose of commercially available quality is suspended in a solvent inert towards the reactants, such as, for example, benzene, toluene, xylene or a paraffin hydrocarbon fraction boiling in the appropriate temperature range. The suspended cellulose is then reacted with suitable acetylating agents, such as acetic acid and/or acetic anhydride, under gentle conditions, i.e., at slightly elevated temperatures up to a maximum of 50° C., and, according to the invention, in the presence of at least one perfluoroalkanesulfonic acid, as a catalyst, for several days. When the acetylation has ended, the triacetylcellulose obtained is separated off from the reaction medium in the usual manner and purified, after which it is in a pulverulent granular form which can be used for most purposes without further purification.

Besides the replacement of the hazardous perchloric acid, the process of the present invention also exhibits other unexpected advantages over the known process.

In the acetylation according to the invention with perfluoroalkanesulfonic acids as the catalyst, there is no agglomeration of the triacetylcellulose particles and concomitant formation of lumps and sticking together of the product as was associated with the prior art process. It is therefore considerably easier to separate off the product from the reaction mixture by vacuum filtration and to purify it by washing and vacuum filtration, with a considerable saving in time.

Moreover, the product is obtained in a particle size range of about 5 to 50 μm which is advantageous for chromatographic purposes, so that it can be used, per se, as a chromatographic adsorbent, or can be separated into corresponding particle size fractions by conventional techniques.

In contrast, the product of the prior art process obtained in a highly agglomerated to lumpy form, is separable only by difficult and time-consuming procedures, and the product must be subjected to grinding and particle size separation so that it can be converted into a form which can be used for chromatographic purposes.

A significant improvement in yield from about 60 to 70% by the conventional processes to, on average, 80 to 85% is also realized by the new process. Moreover, the microcrystalline triacetylcellulose is obtained as a colorless product, that is to say in a higher purity, in contrast to the product from the known process which mostly exhibits a beige to brownish color due to the oxidizing action of the perchloric acid.

The microcrystalline triacetylcellulose prepared by the process according to the invention can be used in a manner which is known, per se, as an adsorbent for chromatographic purposes, in particular for chromatographic resolution of racemates. Thus, it can be processed by itself or it can be combined with other chromatographic adsorbents and, if appropriate, conventional auxiliary agents for the production of adsorbent layers used in layer chromatography, for example, in thin layer or thick layer chromatography plates or films, or for use as column packing for column chromatography or also for high pressure liquid chromatography. The microcrystalline triacetylcellulose prepared by the process according to the invention, because of its higher purity, yields better and more reproducible separation results in chromatographic separation operations compared to the microcrystalline triacetylcellulose prepared by the prior art process.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE

Glacial acetic acid (400 ml) and trifluoromethanesulfonic acid (2.65 ml) are added with stirring to a suspension of 100 g of commercially available microcrystalline cellulose in 1.5 liter of toluene at room temperature. Acetic anhydride (400 ml) are then added dropwise, and the reaction mixture is stirred at about 35° C. for 3 days. When the reaction is completed, the suspension is added to 1 liter of methanol and the product is subjected to vacuum filtration. This product is then suspended in methanol and filtered off by suction, resuspended and refiltered several times and rinsed with petroleum ether.

After drying in air at room temperature, 146 g (82% of the theoretical yield, based on the cellulose) of microcrystalline triacetylcellulose are obtained in the form of a colorless, pulverulent granular product.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the preparation of microcrystalline triacetylcellulose comprising acetylating microcrystalline cellulose in the presence of an acid catalyst, the improvement which comprises employing a catalytic amount of at least one perfluoralkanesulfonic acid having 1–8 carbon atoms as the catalyst.

2. A process according to claim 1, wherein the perfluoralkanesulfonic acid contains 1–3 carbon atoms.

3. A process according to claim 1, wherein the catalyst is trifluoromelkanesulfonic acid.

4. A process according to claim 3 wherein the amount of catalyst is 2–5% by weight based on the weight of the microcrystalline cellulose.

5. A process according to claim 1 wherein the amount of the catalyst is 1–10% by weight based on the weight of the microcrystalline cellulose.

6. A process according to claim 1 further comprising separating resultant microcrystalline triacetylcellulose by vacuum filtration.

* * * * *